3,010,999
ETHYLENICALLY UNSATURATED PHOSPHORUS COMPOUNDS

Albert Y. Garner, Springfield, Mass., assignor to Monsanto Chemical Company, St. Louis, Mo., a corporation of Delaware
No Drawing. Filed May 20, 1960, Ser. No. 30,445
6 Claims. (Cl. 260—606.5)

This invention relates to novel phosphorus compounds. More particularly, it relates to novel ethylenically unsaturated secondary phenylphosphine compounds. This application is a continuation in part of patent application S.N. 813,327, filed May 5, 1959, now abandoned.

The technology of phosphorus polymers has heretofore remained relatively undeveloped. However, phosphorus polymers are growing increasingly attractive for use in specialized applications wherein their novel properties may be advantageously utilized.

It is an object of this invention to provide novel phosphorus compounds.

Another object is the provision of novel secondary phenylphosphine compounds containing ethylenic unsaturation and a process for their manufacture.

A further object is the provision of a new class of polymerizable phosphorus monomers.

These and other objects are attained by reacting substantially equimolar proportions of an alkali metal salt of phenylphosphine and an ethylenically unsaturated organic halide as hereinafter described in a substantially oxygen-free reaction system wherein at least one of the reactants is dissolved in an inert solvent.

The following examples are given in illustration of the invention and are not intended as limitations thereon. Where parts are mentioned they are parts by weight.

Example I

Twenty-seven parts (about 0.2 mol) of sodio-phenylphosphine are dissolved in a mixture of 100 ml. of liquid ammonia and 50 ml. of absolute ether maintained at a temperature of about −70° C. in a stirred reactor under a nitrogen atmosphere. A solution of 25 parts (about 0.2 mol) of 3-bromopropene dissolved in 50 ml. of absolute ether is slowly charged to the reactor while maintaining a reaction temperature of about −60±5° C. After all of the 3-bromopropene solution has been charged, the ammonia and ether are removed by distillation under a nitrogen atmosphere. The remaining fluid is vacuum distilled to purify the product which is a colorless liquid boiling at about 60–65° C. under 3 mm. of mercury pressure and containing about 20.6% of combined phosphorus by weight. Infrared analysis reveals absorption characteristic of ethylenic unsaturation as well as of phosphorus-hydrogen and of phosphorus-phenyl linkages, indicating the product to be 3-(phenylphosphino)propene.

Example II

Fifteen parts (about 0.1 mol) of potassio-phenylphosphine are slurried in 50 ml. of benzene in a stirred reactor equipped with a reflux condenser. The mixture is heated to reflux (circa 80° C.) under a nitrogen atmosphere. Maintaining the reaction system at reflux, a solution of 20 parts (about 0.1 mol) of 2-phenyl-3-bromopropene dissolved in 50 ml. of benzene is slowly charged to the reactor. After all of the 2-phenyl-3-bromopropene solution has been charged, the benzene is removed by distillation under a nitrogen atmosphere. The remaining fluid is vacuum distilled to purify the product which is a pale yellow oil boiling at about 53–55° C. under 0.1 mm. of mercury pressure and containing about 13.7% of combined phosphorus by weight. Infrared analysis reveals absorption characteristic of ethylenic unsaturation as well as of phosphorus-phenyl and of phosphorus-hydrogen linkages, indicating the product to be 3-(phenylphosphino)-2-phenylpropene.

Example III

Thirteen parts (about 0.1 mol) of sodio-phenylphosphine are slurried in 150 ml. of liquid ammonia maintained at a temperature of about −40° C. in a stirred reactor under a nitrogen atmosphere. A solution of 11 parts (about 0.1 mol) of vinyl bromide dissolved in 50 ml. of absolute ether is slowly charged to the reactor while maintaining a reaction temperature of about −30±5° C. After all of the vinyl bromide solution has been charged, the ammonia and ether are removed by distillation under a nitrogen atmosphere. The remaining fluid is vacuum distilled to purify the product which is a colorless liquid containing about 22.7% of combined phosphorus by weight. Infrared analysis reveals absorption characteristic of ethylenic unsaturation as well as of phosphorus-phenyl and of phosphorus-hydrogen linkages indicating the product to be phenylphosphino ethene.

Example IV

Fifteen parts (about 0.1 mol) of potassio-phenylphosphine are slurried in 100 ml. of dioxane in a stirred reactor equipped with a reflux condenser. This mixture is heated to reflux (circa 101° C.) under a nitrogen atmosphere. Maintaining the reaction system at reflux, a solution of 18 parts (about 0.1 mol) of alpha-bromostyrene dissolved in 75 ml. of dioxane is slowly charged to the reactor. After all of the alpha-bromostyrene solution has been charged, the dioxane is removed by distillation under a nitrogen atmosphere. The remaining fluid is vacuum distilled to purify the product which is a colorless liquid containing about 14.6% of combined phosphorus by weight. Infrared analysis reveals absorption characteristic of ethylenic unsaturation as well as of phosphorus-phenyl and of phosphorus-hydrogen linkages, indicating the product to be alpha-phenylphosphino styrene.

The ethylenically unsaturated organic halides employed in the practice of this invention correspond to general formulae of the group consisting of:

(1)
$$X-\underset{R}{C}=CH_2$$

(2)
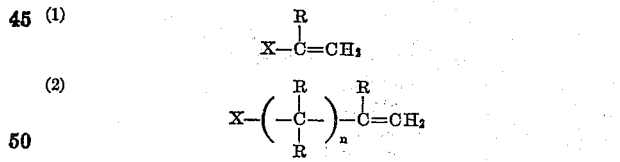

In each of the above formulae, $n$ is an integer of from 1–6, X is either bromine, chlorine or iodine and each R may be, independently, either a hydrogen, a methyl or a phenyl radical.

Therefore, the 3-bromopropene, 2-phenyl-3-bromopropene, vinyl bromide and alpha-bromostyrene employed in the examples may be replaced, for example, with one of the following ethylenically unsaturated halides with equivalent results:

(1) A vinylidene halide such as vinyl bromide, vinyl chloride, vinyl iodide, 2-bromo-1-propene, 2-chloro-1-propene, alpha-chlorostyrene, alpha-iodostyrene, etc.; and (2) An omega-halogenated olefin such as 3-chloropropene, 4-bromo-1-butene, 5-iodo-1-pentene, 6-chloro-1-hexene, 7-bromo-1-heptene, 8-iodo-1-octene, etc. and the methyl and phenyl substituted derivatives thereof such as 2-methyl-3-chloropropene,
3-bromo-1-butene,
2-methyl-3-iodo-1-butene,
2,3-dimethyl-3-chloro-1-butene,
alpha-chloromethyl styrene, 3-bromo-3-phenyl propene,
2,3-diphenyl-3-iodo propene,
3,3-diphenyl-3-chloro propene,
2-phenyl-3-bromo-1-butene,
2-methyl-3-phenyl-3-chloro propene,
2-methyl-4-bromo-1-butene,
4-iodo-1-pentene,
2-phenyl-4-bromo-1-butene,
4-phenyl-4-chloro-1-butene,
2,4-diphenyl-4-chloro-1-butene,
2-methyl-4-bromo-1-pentene,
2,3-dimethyl-4-iodo-1-butene,
2,4-dimethyl-4-chloro-1-pentene,
3,4-diphenyl-4-bromo-1-butene,
2,3,3-trimethyl-4-chloro-1-pentene,
2,3-dimethyl-3-phenyl-4-chloro-1-butene,
2-methyl-5-bromo-1-pentene,
2-phenyl-5-bromo-1-pentene,
4-methyl-5-chloro-1-pentene,
3-phenyl-5-iodo-1-pentene,
5-chloro-1-hexene,
5-phenyl-5-bromo-1-pentene,
2,4-dimethyl-5-chloro-1-pentene,
3,4-diphenyl-5-iodo-1-pentene,
2,3-dimethyl-5-chloro-1-hexene,
2,4,5-triphenyl-5-bromo-1-pentene,
2,4-dimethyl-3-phenyl-5-chloro-1-pentene,
2,4-diphenyl-4-methyl-5-bromo-1-pentene,
2,3,3,4-pentamethyl-5-chloro-1-pentene,
2,3,3,4-tetramethyl-5-bromo-1-hexene,
2-methyl-6-chloro-1-hexene,
4-methyl-6-chloro-1-hexene,
5-methyl-6-iodo-1-hexene,
2-phenyl-6-bromo-1-hexene,
2,5-dimethyl-6-chloro-1-hexene,
3-methyl-6-iodo-1-heptene,
2-phenyl-4,5-dimethyl-6-bromo-1-hexene,
2-methyl-3,5-diphenyl-6-chloro-1-heptene,
2,3,4,5-tetramethyl-6-bromo-1-heptene,
3,4-diphenyl-6-iodo-1-hexene,
2-methyl-7-bromo-1-heptene,
2-phenyl-7-chloro-1-heptene,
5-methyl-7-bromo-1-heptene,
7-phenyl-7-chloro-1-heptene,
7-iodo-1-octene,
2,4,6-trimethyl-7-chloro-1-heptene,
3,5-dimethyl-7-bromo-1-octene,
2,5,6-triphenyl-7-chloro-1-heptene,
2-phenyl-4,6-dimethyl-7-bromo-1-heptene,
2,4,5-trimethyl-2-phenyl-7-chloro-1-heptene,
2-methyl-8-bromo-1-octene,
2-phenyl-8-bromo-1-octene,
4-phenyl-8-chloro-1-octene,
2,3,5,7-tetramethyl-8-chloro-1-octene,
2-phenyl-3,6-dimethyl-8-bromo-1-nonene, etc.

The alkali metal salts of phenylphosphines employed in the practice of this invention correspond to the general formula:

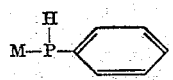

M is an alkali metal radical, i.e., either a lithium, sodium, potassium, cesium or a rubidium radical. Therefore, the sodio- and potassio-phenylphosphines employed in the examples may be replaced by lithio-, rubidio- or cesio-phenylphosphine with equivalent results. These salts are readily prepared by reacting substantially equimolar proportions of an alkali metal and phenylphosphine in a highly polar but inert solvent, e.g., liquid ammonia or sulfur dioxide, under an inert atmosphere. This type of synthesis is described in greater detail by C. H. S. Hitchcock and F. G. Mann in the Journal of the Chemical Society, June 1958 (429), pp. 2081–2086.

The unsaturated secondary phenylphosphine compounds which form the subject of this invention correspond to general formulae of the group consisting of:

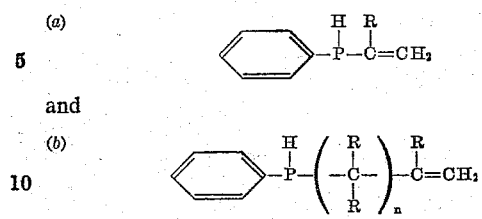

depending upon the ethylenically unsaturated organic halide employed. In each of these formulae, R are radicals as heretofore disclosed.

These compounds are prepared by reacting substantially equimolar proportions of an alkali metal salt of phenylphosphine and an ethylenically unsaturated organic halide, of the classes heretofore disclosed, under an inert, e.g., nitrogen, atmosphere. The reaction is effected in the presence of a solvent inert to the reactants. Suitable solvents include, for example, hydrocarbons such as benzene, toluene, xylene, hexane, cyclohexane, etc. or polar solvents such as ether, dioxane, tetrahydrofuran, liquid ammonia, liquid sulfur dioxide, etc. It is not necessary that both reactants be soluble in the solvent employed. However, it is preferred to employ a polar solvent, or a mixture of solvents, in which both reactants are soluble. The reaction temperature employed is usually dictated by practical requirements since the reaction proceeds efficiently at all temperatures. When liquid ammonia or sulfur dioxide are employed as the solvent, sub-zero temperatures below the boiling points of such are generally required. Super-atmospheric pressures may optionally be employed to raise the boiling point of the solvent employed.

The final reaction mixture is comprised of the desired ethylenically unsaturated secondary phenylphosphine in admixture with solvent and residual reactants. Precipitated metal halide is also present. Recovery of the product is accomplished according to conventional techniques. The precipitated salt may be removed by, e.g., filtration or decantation. The solvent and residual reactants may be removed, for example, by distillation, either under vacuum or under an inert atmosphere. The ethylenically unsaturated secondary phenylphosphines so produced are generally fluids. However, those of higher molecular weight, especially those containing two or more phenyl groups, may be crystalline or waxy solids.

These ethylenically unsaturated secondary phosphines are useful as antioxidants for incorporation into such resinous compositions as, e.g., synthetic or natural rubber, styrene or substituted styrene polymers, vinyl ester polymers such as polyvinyl chloride, polyvinyl acetate, etc., acrylic polymers such as polyacrylonitrile, polymethylmethacrylate, etc. They may also be polymerized to form linear polyphosphines which are generally flame-resistant resins useful as flameproofing agents for paper, textiles, wood, etc. Such resins may also be molded, extruded or cast as sheets, films, tubing, etc. for, e.g., electrical insulation, fire barriers, surface coatings, etc.

*Example V*

Forty parts of the 3-(phenylphosphino)propene prepared in Example I are charged to a 250 ml. glass flask equipped with a reflux condenser. The monomer is placed under a nitrogen atmosphere and is then irradiated with ultraviolet light for about 20 hours at room temperature. The resulting solid material is dissolved in 150 ml. of a 1:1 by weight mixture of acetone and benzene, which solution is then poured into an excess of absolute ether to precipitate the polymer. A hard, clear, glass-like polymer containing about 20.6% phosphorus by weight is obtained in about 95% yield. This polymer is soluble in acetone and methanol. Upon testing for flammability by holding the polymer in the flame of a Meeker burner until it ignites, the polymer is found to be self-extinguishing.

*Example VI*

A rectangular chip of ponderosa pine measuring about ¼″ x 1″ x 3″ is immersed for 4 hours in 80 ml. of a 50% by weight solution of the 3-(phenylphosphino)propene polymer obtained in Example V dissolved in benzene. The pine chip is then heated in an air oven at 80° C. for about 3 hours to remove all adsorbed solvent. Testing for flammability by holding the pine chip vertically in the flame of a Meeker burner until it ignites, the chip is found to be self-extinguishing.

It is obvious that many variations may be made in the products and processes set forth above without departing from the spirit and scope of this invention.

What is claimed is:

1. An ethylenically unsaturated secondary phenylphosphine corresponding to a general formula selected from the group consisting of:

(a) 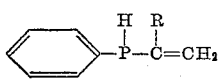

and (b) 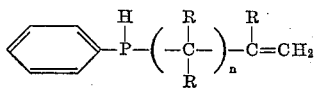

wherein, in each of the above formulae, *n* is an integer of from 1 to 6 and each R is a radical independently selected from the group consisting of hydrogen, methyl and phenyl radicals.

2. 3-(phenylphosphino)propene.
3. Alpha-phenylphosphino styrene.
4. Phenylphosphino ethene.
5. 3-(phenylphosphino)-2-phenylpropene.
6. A process for preparing an ethylenically unsaturated secondary phenylphosphine corresponding to a general formula selected from the group consisting of:

(a) 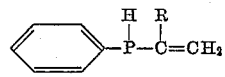

and (b) 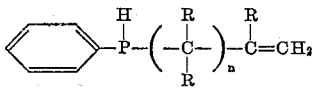

which comprises reacting substantially equimolar proportions of an alkali metal salt of phenylphosphine corresponding to the general formula:

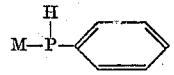

and an ethylenically unsaturated organic halide corresponding to a general formula selected from the group consisting of:

(1) 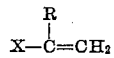

and (2) 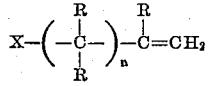

in a substantially oxygen-free reaction system with at least one of the reactants dissolved in an inert solvent; wherein, in each of the above formulae, M is an alkali metal radical, X is a halogen radical selected from the group consisting of bromine, chlorine and iodine, *n* is an integer of from 1 to 6 and each R is a radical independently selected from the group consisting of hydrogen, methyl and phenyl radicals.

No references cited.